(12) United States Patent  
Nakano

(10) Patent No.: US 7,982,948 B2  
(45) Date of Patent: Jul. 19, 2011

(54) SCANNING MICROSCOPE FOR 3-D IMAGING OF A MOVING SPECIMEN

(75) Inventor: Mitsuhiro Nakano, Hachioji (JP)

(73) Assignee: Olympus Corporation, Tokyo (JP)

( * ) Notice: Subject to any disclaimer, the term of this patent is extended or adjusted under 35 U.S.C. 154(b) by 416 days.

(21) Appl. No.: 12/329,975

(22) Filed: Dec. 8, 2008

(65) Prior Publication Data

US 2009/0153955 A1    Jun. 18, 2009

(30) Foreign Application Priority Data

Dec. 14, 2007  (JP) .................................. 2007-323588

(51) Int. Cl.
*G02B 21/06*    (2006.01)
*G06T 15/00*    (2011.01)

(52) U.S. Cl. ........................ 359/368; 359/389; 382/154

(58) Field of Classification Search ................. 359/368, 359/385, 388, 389; 382/154, 305
See application file for complete search history.

(56) References Cited

U.S. PATENT DOCUMENTS

| | | | | |
|---|---|---|---|---|
| 6,185,036 | B1 * | 2/2001 | Tanaami | 359/368 |
| 7,271,382 | B2 * | 9/2007 | Engelmann et al. | 250/234 |
| 7,459,698 | B2 * | 12/2008 | Engelmann et al. | 250/459.1 |
| 7,649,683 | B2 * | 1/2010 | Engelmann et al. | 359/385 |
| 7,709,773 | B2 * | 5/2010 | Yamashita et al. | 250/201.3 |
| 2005/0122577 | A1 * | 6/2005 | Fujimoto et al. | 359/383 |
| 2005/0280818 | A1 | 12/2005 | Yamashita et al. | |
| 2009/0034062 | A1 * | 2/2009 | Okugawa | 359/368 |

FOREIGN PATENT DOCUMENTS

| | | |
|---|---|---|
| JP | 2003-195174 A | 7/2003 |
| JP | 2004-133156 A | 4/2004 |
| WO | WO 2006/121435 A | 11/2006 |

OTHER PUBLICATIONS

Extended European Search Report dated Apr. 6, 2009 (5 pages), issued in counterpart European Application Serial No. 08021072.7.

* cited by examiner

*Primary Examiner* — Mark Consilvio  
(74) *Attorney, Agent, or Firm* — Holtz, Holtz, Goodman & Chick, PC

(57) ABSTRACT

A scanning microscope includes a source of illumination light; a scanner scanning the illumination light in a two-dimensional direction crossing a light axis; a lens irradiating the illumination light to a sample, and collecting return light from the sample; a focusing position adjuster adjusting a focal position in a light axis direction; and a light detector detecting collected light. A storage section stores the intensity of detected light, and positional information of an irradiating position of the illumination light set by the scanner and the focusing position adjuster. An image processor acquires images parallel to the light axis based on the intensity of return light and the stored positional information, and processes the images to detect a moving distance along a light axis direction of an area of the sample. The focusing position adjuster is controlled to correct a light condensing position of the illumination light.

3 Claims, 6 Drawing Sheets

SCANNING MICROSCOPE FOR 3-D IMAGING OF A MOVING SPECIMEN

BACKGROUND OF THE INVENTION

1. Field of the Invention

The present invention relates to a scanning microscope.

This application is based on Japanese Patent Application No. 2007-323588, the content of which is incorporated herein by reference.

2. Description of Related Art

In order to prevent inconvenience that a focal position is vertically displaced due to flexure of a microscope body caused by increased temperature of the body or the like during long observation, a laser scanning microscope has been known in the past, which monitors a luminance value of reflected light from a surface of glass outside a sample as an observation object mounted on the glass, and vertically adjusts a position of an objective lens or a position of a stage to prevent variation in luminance value of the reflected light from the glass surface whenever laser light scan is performed (refer to Japanese Unexamined Patent Application, Publication No. 2004-133156, "hereinafter referred to as "JP-A-2004-133156"").

However, the laser scanning microscope described in JP-A-2004-133156 has such inconvenience that while displacement in focal position due to flexure or the like of the microscope body can be corrected, when a sample moves as in the case that the sample includes a biological cell, such movement of the sample cannot be corrected. In particular, while such movement of the sample occurs not only in a vertical direction, but also in a horizontal direction, the movement of the sample cannot be corrected by the laser scanning microscope disclosed in JP-A-2004-133156. In addition, a view field needs to be moved into a region outside the sample to monitor reflected light from the glass surface outside the sample, leading to inconvenience that an observation image of the sample may be broken, or change of the sample may be overlooked.

BRIEF SUMMARY OF THE INVENTION

The invention was made in the light of the above circumstances, and an object of the invention is to provide a laser scanning microscope, which can automatically correct an observation position such that the observation position follows movement of a sample not only in the case that a microscope body is deformed, but also in the case that the sample moves in any direction.

To achieve the object, the invention proposes the following means.

A scanning microscope according to an aspect of the invention includes a light source that emits illumination light; a scanner that scans the illumination light from the light source in a two-dimensional direction crossing to a light axis; an objective lens that irradiates the illumination light scanned by the scanner to a sample, and collects return light from the sample; a focusing position adjustment section that adjusts a focal position in a light axis direction of the objective lens; a light detector that detect the return light collected by the objective lens; a storage section that stores intensity of the return light detected by the light detector, and positional information of an irradiating position of the illumination light set by the scanner and the focusing position adjustment section while relating the intensity to the positional information; an image processing section that forms a plurality of two-dimensional images parallel to the light axis on the basis of the intensity of the return light and the positional information of the irradiating position stored in the storage section with a time interval, and processes the two-dimensional images so as to detect a moving distance along a light axis direction of a pointed area of the sample; and a controller that controls the focusing position adjustment section so as to correct a light condensing position of the illumination light in accordance with the moving distance of the pointed area detected by the image processing section.

According to the aspect, the illumination light emitted from the light source is scanned by the scanner in the two-dimensional direction crossing to the light axis, thereby the illumination light is two-dimensionally irradiated onto the sample via the objective lens. The focusing position adjustment section operates to adjust the focal position in the light axis direction of the objective lens, thereby an irradiation plane of the illumination light can be moved in the light axis direction. Return light returning from the sample as a result of irradiating the illumination light is collected by the objective lens, then detected by the light detector, and then stored in the storage section while being related to the irradiating position of the illumination light. Thus, a two-dimensional image or a three-dimensional image extending in a direction crossing to the light axis can be constructed at a predetermined depth position.

In this case, according to the aspect, the image processing section may operate to extract a two-dimensional image parallel to the light axis from the intensity of the return light and the positional information of the irradiating position stored in the storage section. Two-dimensional images acquired at different time are processed, which allows detection of the moving distance along the light axis direction of the pointed area of the sample. When the image processing section detects the moving distance along the light axis direction of the pointed area of the sample, the controller operates to control the focusing position adjustment section so that the light condensing position of the illumination light is corrected in accordance with the movement of the pointed area.

That is, unlike a usual method in which reflected light from a glass surface outside the sample is monitored, image information of a sample is processed so that an observation position automatically follows not only deformation of a microscope body but also displacement of a focusing position on the sample or movement of the sample, therefore a clear image can be acquired without overlooking the pointed area while keeping a certain observation condition.

In the aspect, it is acceptable that the storage section stores a plurality of sets of three-dimensional image information produced by acquiring a plurality of two-dimensional image information in the light axis direction with a time interval, the plurality of two-dimensional image information being along a direction crossing to the light axis, and being acquired during scanning of the illumination light by the scanner, and the image processing section forms a plurality of two-dimensional images parallel to the light axis on the basis of the plurality of sets of three-dimensional image information stored in the storage section.

Thus, the focusing position can be adjusted following movement of the pointed area in the light axis direction on the basis of only three-dimensional image information to be used for observation, so that clear image car be acquired without overlooking the pointed area In the aspect, at least one of the two-dimensional images parallel to the light axis may he acquired before acquiring the three-dimensional image information.

Thus, the two-dimensional image parallel to the light axis is acquired before acquiring the three-dimensional image information to be used for observation, and used for detecting movement distance of the pointed area, thereby movement of the pointed area can be detected at a relatively short time interval, and consequently light condensing position of the illumination light can be relatively accurately corrected.

That is, the two-dimensional image parallel to the light axis is acquired before acquiring later three-dimensional image information between the two sets of three-dimensional image information acquired with a time interval. This enables image processing of the two-dimensional image and a two-dimensional image parallel to the light axis, which is extracted from three-dimensional image information being previously acquired. When movement of the pointed area is detected in this way, image processing can be performed using two-dimensional images being temporally closely acquired compared with a case of image processing of two two-dimensional images extracted from two sets of three-dimensional image information respectively.

According to the invention, the following advantage is exhibited, that is, an observation position can be automatically corrected so as to follow a sample not only in the case that a microscope body is deformed, but also in the case that the sample moves in any direction.

DETAILED DESCRIPTION OF THE INVENTION

Figure 1:
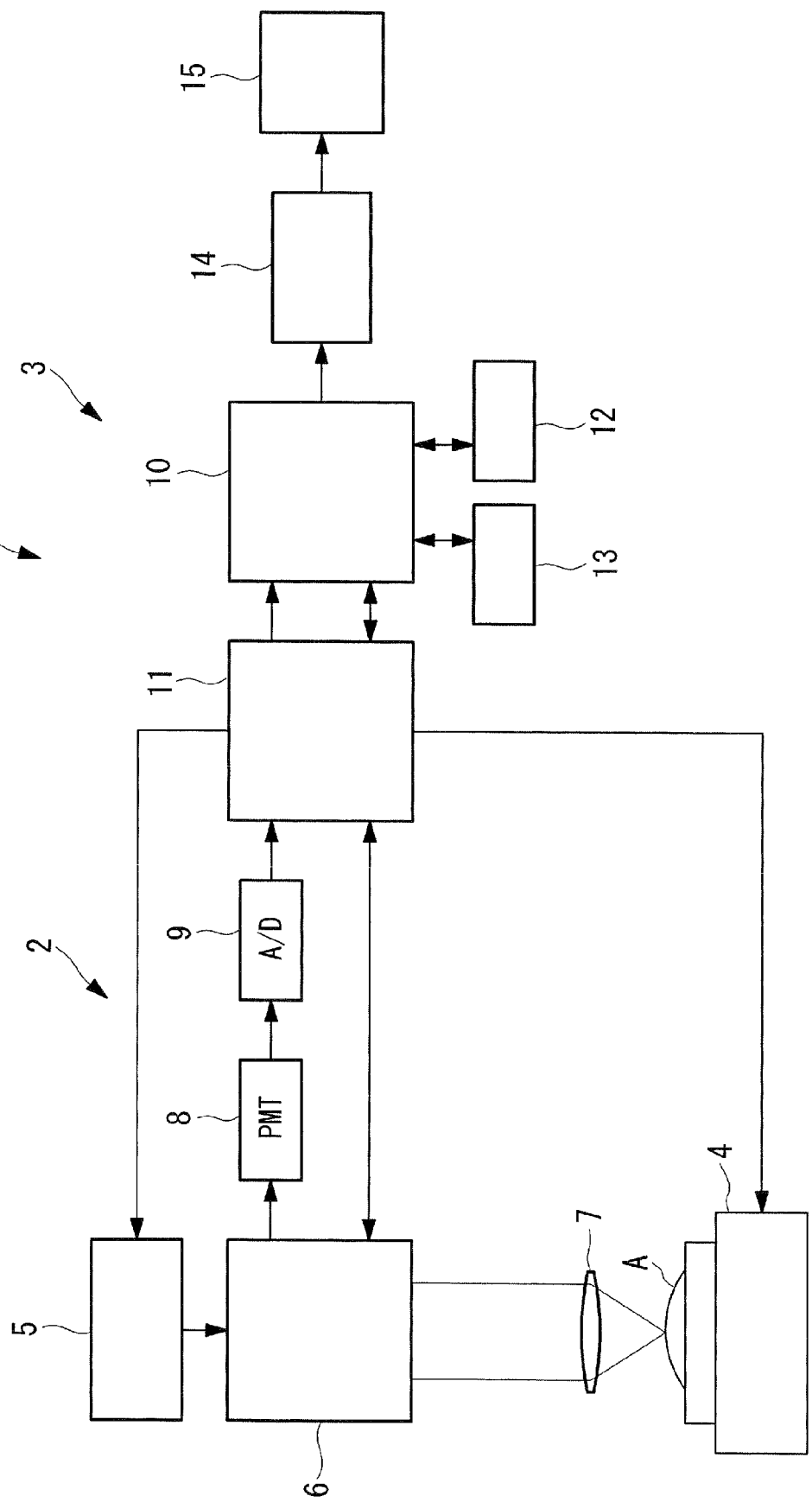
FIG. 1 shows a general block diagram showing a laser scanning microscope according to an embodiment of the invention.
Figure 2:
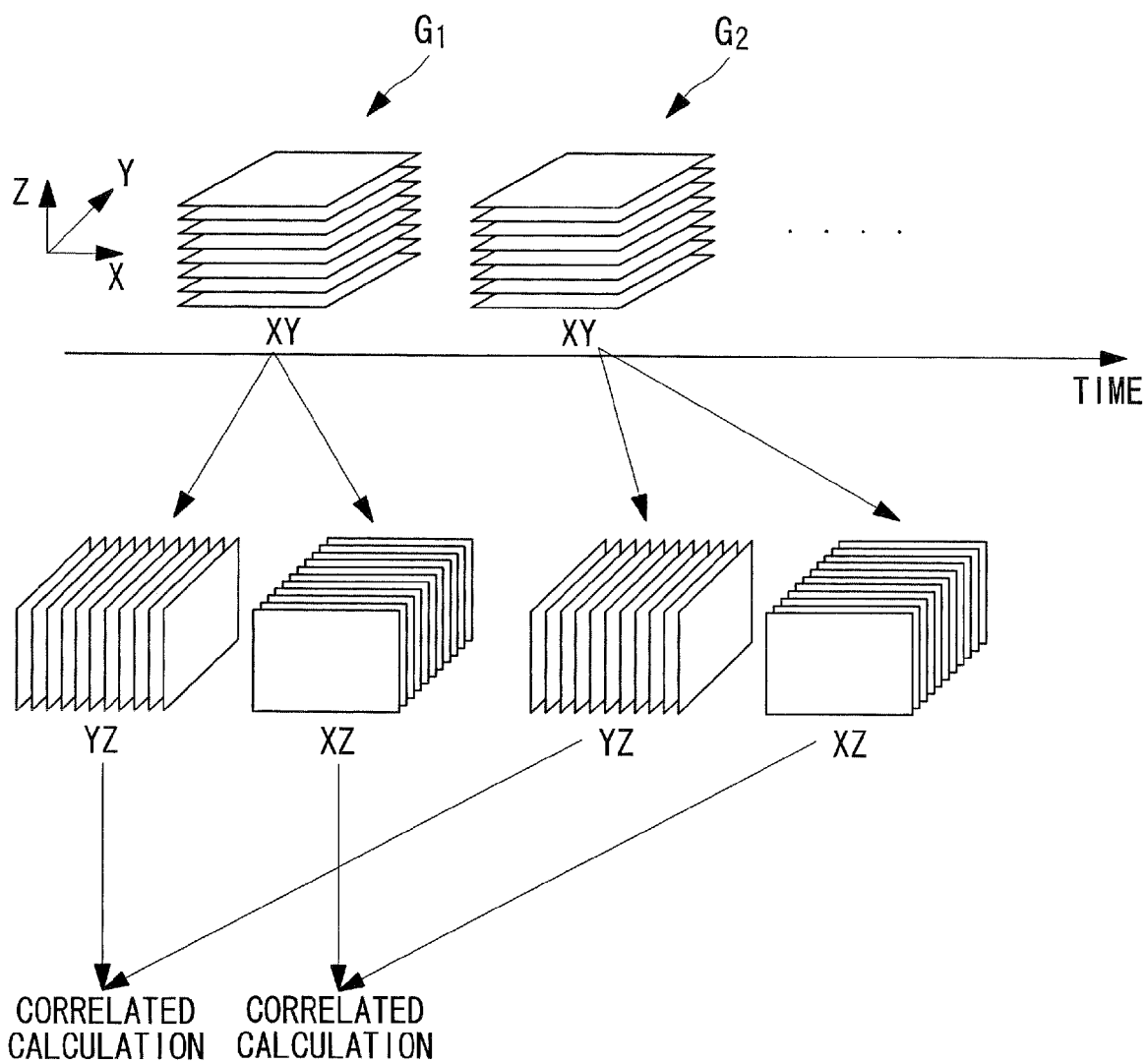
FIG. 2 shows a diagram illustrating a detection step of a moving distance of a pointed area of a sample from three-dimensional image information acquired by the laser scanning microscope of FIG. 1.

A laser scanning microscope 1 according to embodiment 1 of the invention is described below with reference to FIGS. 1 to 3.

The laser scanning microscope 1 according to the embodiment includes a microscope body 2 and a controller 3 that controls the microscope body 2.

The microscope body 2 includes an electromotive stage 4 that is mounted with a sample A, and moves the sample A in horizontal bidirection and vertical directions; a laser source 5 that emits laser light; a scanner 6 that two-dimensionally scans the laser light emitted from the laser source 5; an objective lens 7 that irradiates the laser light scanned by the scanner 6 to the sample A, and collect return light returning from the sample A; a light detector 8 such as photo multiplier tube (PMT) that detects return light via the objective lens 7 and the scanner 6; and a controller unit 11 that transfer luminance information, which is detected by the light detector 8, and converted into a digital signal via an A/D converter 9, to a computer 10, and controls the electromotive stage 4, the laser source 5, and the scanner 6 according to an instruction from the computer 10.

The controller 3 includes an input section 12 to be inputted with an observation condition; a computer 10 that sends an instruction signal to the control unit 11 to drive electromotive stage 4, the laser source 5, and the scanner 6 on the basis of the observation condition inputted from the input section 12, and constructs image information on the basis of luminance information transferred from the control unit 11, scan position information given by the scanner 6, and positional information of the electromotive stage 4; a storage section 13 that stores the observation condition inputted from the input section 12 and the image information constructed by the computer 10; a frame memory 14 that stores the image information constructed by the computer 10; and a display section 15 that displays image information stored in the frame memory 14.

The observation condition inputted from the input section includes a focusing position of an observation point on the sample A, a scan area of the scanner 6, a movement area in a vertical direction of the electromotive stage 4, the number of slices, a condition for acquiring an image and the like. The computer 10 calculates a position of the electromotive stage 4 for each observation point, a wavelength or intensity of laser light emitted from the laser source 5, sensitivity of the light detector 8, a swinging angle of a galvano mirror (omitted to be shown) configuring the scanner 6, vertical direction feed of the electromotive stage 4 and the like on the basis of the inputted observation condition, and outputs each calculated value to the control unit 11.

Thus, on the basis of the observation condition stored in the storage section 13, the control unit 11 actuates the electromotive stage 4 so that a focusing position of the laser light focused by the objective lens 7 corresponds to a predetermined observation point on the sample A. Then, laser light having a selected wavelength and intensity is emitted from the laser source 5, and the laser light is scanned in a horizontal direction (XY direction) by the scanner 6 within a set scan area. Then, return light generated at each of positions on the sample A irradiated with the laser light is detected by the light detector 8 via the objective lens 7 and the scanner 6, and luminance information from the light detector is stored while being related to a scan position, thereby one two-dimensional image in the XY direction can be acquired.

The control unit 11 repeats the step of activating the electromotive stage 4 to move a plane to be scanned in a vertical direction with a predetermined vertical direction feed, and the step of acquiring the two-dimensional image in the XY direction, thereby three-dimensional image information consisted a bunch of two-dimensional images in the XY direction can be acquired.

The computer 10 processes the three-dimensional image information acquired with a time interval, thereby detects a moving distance of a pointed area of the sample A for each observation point. Here, such detection is described, for example, with an area having the highest luminance as the pointed area.

When the pointed area of the sample A moves in the vertical direction, the electromotive stage 4 is activated to correct the focusing position of the observation point so that the focusing position moves by a distance corresponding to the detected moving distance. When the pointed area of the sample A moves in the horizontal direction, the stage 4 is activated to correct the scan area of the scanner 6 so that the scan area moves by a distance corresponding to the detected moving distance Specifically, when two sets of three-dimensional image information G1 and G2 acquired with a time interval exists as shown in FIG. 2, the computer 10 generates a set of two-dimensional images in an XZ direction, and a set of two-dimensional images in a YZ direction from each of the sets of image information G1 and G2. Two-dimensional images corresponding to each other in the XY direction between the two sets, and two-dimensional images corresponding to each other in the XZ direction between the two sets are subjected to correlated calculation respectively, and then an average value of calculation results is calculated, thereby moving distances in X, Y and Z directions of the pointed area of the sample A are calculated respectively.

Figure 3A:
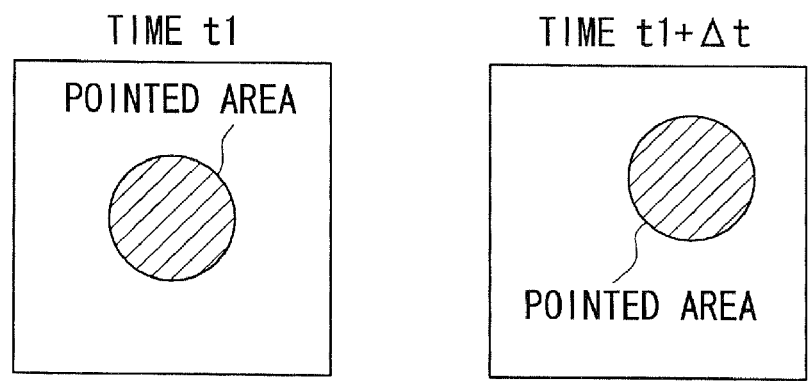
FIG. 3A shows a diagram illustrating correlated calculation in the detection step of the moving distance of FIG. 2, showing images to be compared.
Figure 3B:
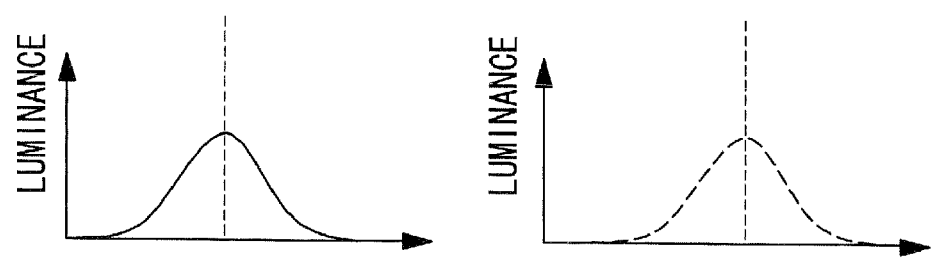
FIG. 3B shows a diagram illustrating the correlated calculation in the detection step of the moving distance of FIG. 2, showing luminance distribution of the images to be compared.
Figure 3C:
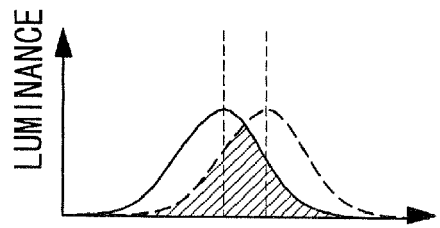
FIG. 3C shows a diagram illustrating the correlated calculation in the detection step of the moving distance of FIG. 2, showing an overlapped area.

As shown in FIG. 3, the correlated calculation is carried out in such a way that when there are two two-dimensional images acquired with an interval of time Δt, while a two-dimensional image is displaced with respect to another two-dimensional image, a position, at which an overlapped area between the images (shaded area in FIG. 3C) is maximized, is searched, and amount of displacement at the position is calculated as the moving distance. Since calculation becomes huge, it is acceptable that fast Fourier transformation is performed before correlated calculation, and inverted fast Fourier transformation is performed after the correlated calculation.

Operation of the laser scanning microscope 1 according to the embodiment configured in this way is described below.

According to the laser scanning microscope 1 according to the embodiment, the computer 10 sets a wavelength and intensity of laser light emitted from the laser source 5, a moving position of the sample A moved by the electromotive stage 4, a scan area of the scanner 6, and sensitivity of the light detector 8 on the basis of the observation condition being inputted from the input section 12, and stored in the storage section 13, and sends such set values as instructions to the control unit 11.

The control unit 11 sets the wavelength and intensity of laser light, the scan area of the scanner 6, and the sensitivity of the light detector 8 according to the instructions from the computer 10, and drives the electromotive stage 4 so as to focus the laser light to an observation point of the sample A. When the scanner 6 scans the laser light in the XY direction at such a positional condition, return light generated at an irradiating position of the laser light on the sample A is detected by the light detector 8 via the objective lens 7 and the scanner 6.

Luminance information of return light detected by the light detector 8, and a scan position of the scanner 6 at that time are stored while being related to each other by the storage section 13, thereby two-dimensional image information in the XY direction of one image is acquired. The acquired two-dimensional image information is stored even in the frame memory 14, and displayed on the display section 15.

The two-dimensional image information in the XY direction is repeatedly acquired while feeding the sample A in the Z direction by the electromotive stage 4, thereby a set of three-dimensional image information is acquired, which consists a plurality of two-dimensional images in the XY direction being bunched in the Z direction. Such operation of acquiring the three-dimensional image information is repeated with a time interval, thereby a plurality of sets of three-dimensional image information can be acquired.

In this case, at a point when two sets of three-dimensional image information G1 and G2 are acquired, the computer 10 extracts two-dimensional images parallel to the light axis from respective sets of the three-dimensional image information G1 and G2. Specifically, the computer extracts a set of a plurality of two-dimensional images in the XZ direction and a set of a plurality of two-dimensional images in the YZ direction from a set of a plurality of two-dimensional images in the XY direction.

Two-dimensional images corresponding to each other in the XZ direction between the extracted two sets, and two-dimensional images corresponding to each other in the YZ direction between the extracted two sets are subjected to correlated calculation respectively, thereby a moving distance of a pointed area is calculated. Two-dimensional images parallel to the light axis are subjected to correlated calculation, thereby movement of the pointed area along a light axis direction can be detected.

When movement of the pointed area is detected, the computer 10 corrects the observation condition stored in the storage section 13. When the pointed area moves in the Z direction, the computer corrects positioning height of the sample A positioned by the electromotive stage 4 so as to correct a focusing position of laser light to the sample A. When the pointed area moves in the X or Y direction, the computer corrects the scan area of the scanner 6 to be translated by a distance corresponding to the detected moving distance.

Thus, even if the sample A moves not only in a vertical direction but also in a horizontal direction during temporal observation such as the case that the sample A includes a biological cell, a certain observation condition can be kept while following the sample A without overlooking the sample. Unlike a usual method in which reflected light from a glass surface outside the sample A is monitored, this leads to an advantage that image information of the sample A is processed so as to correct displacement of an observation position due to not only deformation of the microscope body 2 but also movement of the sample A, consequently a clear image can be acquired. Moreover, a view field need not be moved to a region outside the sample to monitor reflected light from the glass surface outside the sample, which eliminates the inconvenience that an observation image of the sample may be broken, or change of the sample may be overlooked.

In the embodiment, the two-dimensional images in the XZ direction and the two-dimensional images in the YZ direction are extracted from the bunch of two-dimensional images in the XY direction respectively, and moving distances of a pointed area are detected in the X, Y and Z directions However, in place of this, it is acceptable that only the two-dimensional images in the XZ or YZ direction are extracted, and a moving distance in the Z direction is detected from the extracted two-dimensional images in the XZ or YZ direction, and a moving distance in the XY direction is detected by performing correlated calculation of two-dimensional images in the XY direction before extraction.

While movement of the pointed area is detected in the XZ and YZ directions, the movement may be detected along an axis in each of the X, Y and Z directions to correct it.

In the embodiment, an average value of moving distances given by calculating all the extracted two-dimensional images in the XZ and YZ directions by the correlated calculation is determined as a moving distance of the pointed area. However, in place of this, the moving distance may be detected using only two-dimensional images near respective centers of bunches of the extracted two-dimensional images in the XZ and YZ direction. This provides an advantage that calculation amount can be decreased, leading to prompt correction.

Figure 4:
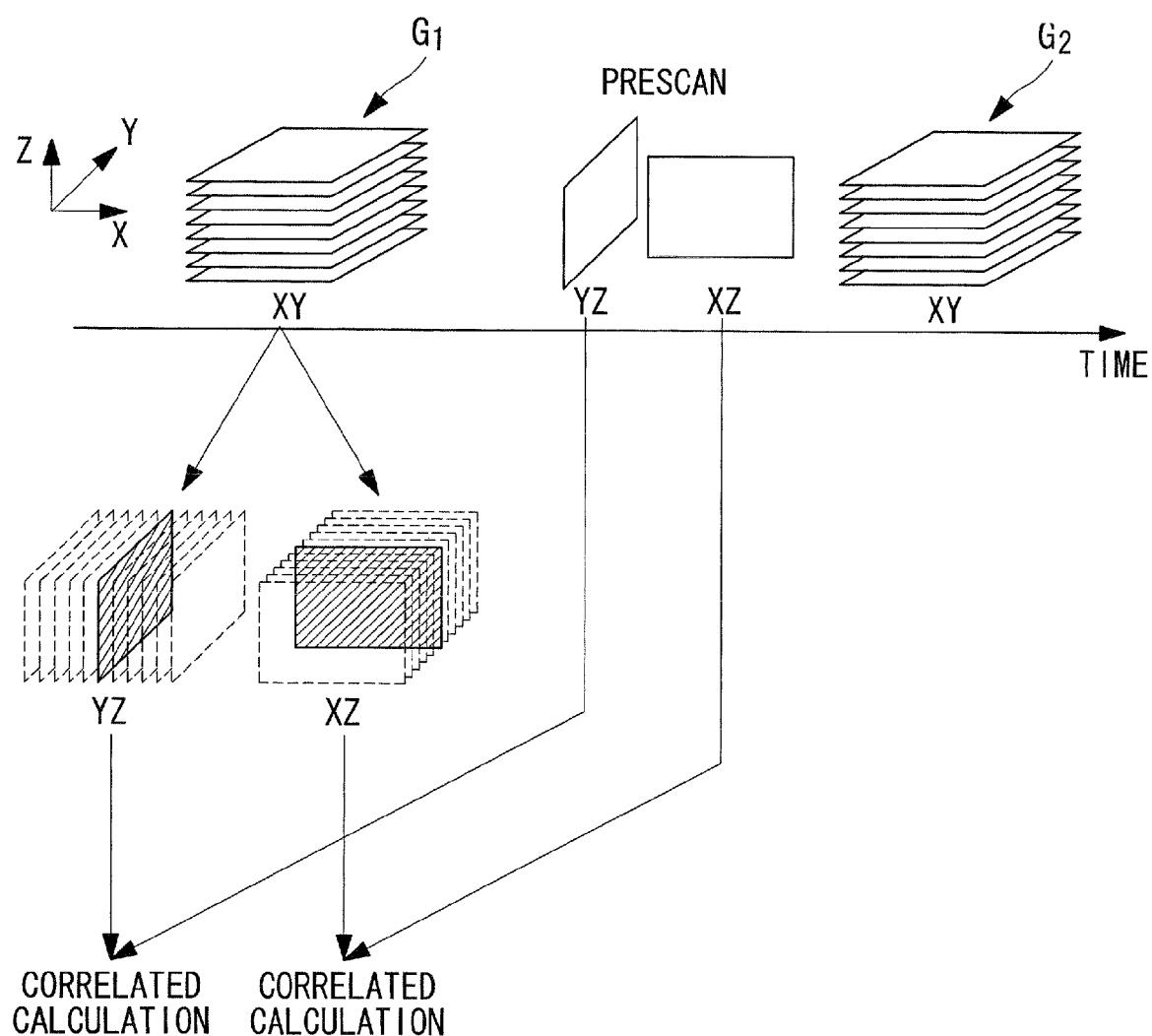
FIG. 4 shows a diagram showing a first modification of the detection step of the moving distance of FIG. 2, illustrating a case that prescan is performed.

As shown in FIG. 4, if a typical two-dimensional image in the XZ or YZ direction is acquired before acquiring three-dimensional image information G2 (prescan), movement of a pointed area can be detected by correlated calculation of the relevant two-dimensional image and a two-dimensional image in the XZ or YZ direction, which is extracted from the three-dimensional image information G1 being previously acquired. Thus, the two-dimensional images to be subjected to correlated calculation can be made temporally closer to each other, and a result of such detection is reflected to acquisition of the three-dimensional image information G2 performed after prescan, thereby relatively fine collection can be performed.

Figure 5:
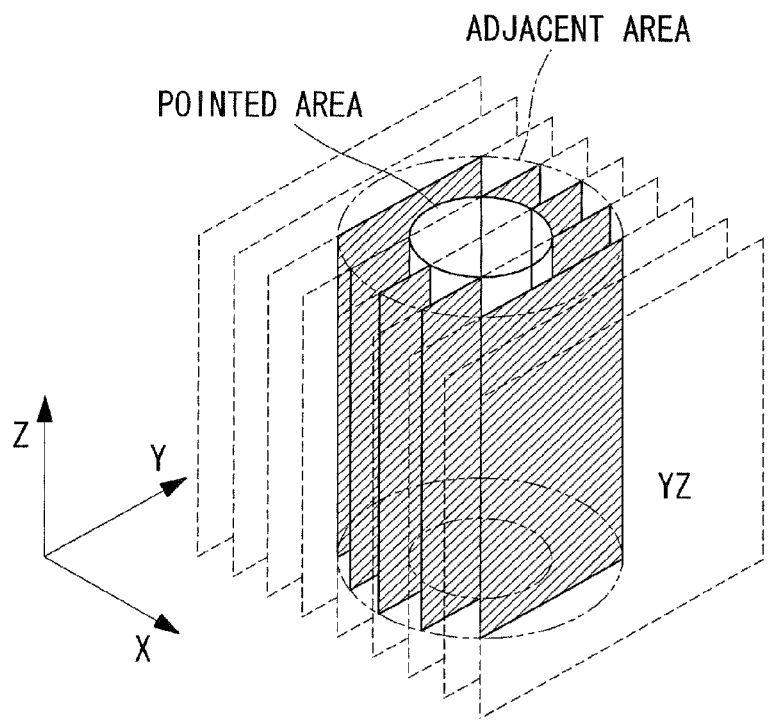
FIG. 5 shows a diagram showing a second modification of the detection step of the moving distance of FIG. 2, illustrating a case that only an adjacent area of a pointed area is subjected to prescan.

When prescan is performed, a typical two-dimensional image in the XZ or YZ direction only in an area adjacent to the pointed area may be acquired and subjected to correlated calculation as shown in FIG. 5. Thus, a moving distance of a pointed area can be estimated without irradiating extra laser light to the pointed area. Therefore, deterioration of the pointed area of the sample A due to irradiation of laser light can be prevented, and consequently the sample A can be observed while being kept in a good condition.

When correlated calculation is performed using two prescan images parallel to the light axis acquired with a time interval, an image to be acquired for actual observation may include an XY image at a position in the Z direction at one place.

Figure 6:
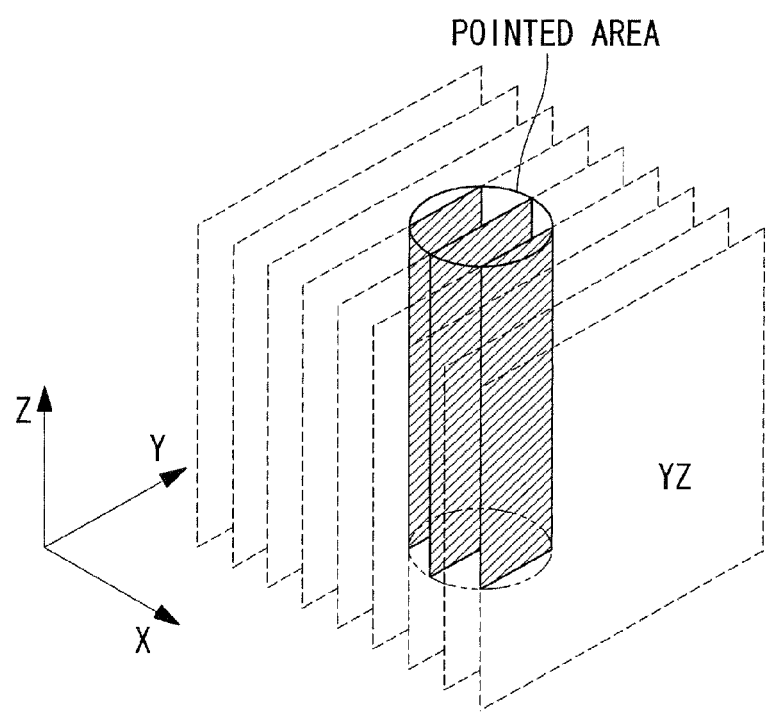
FIG. 6 shows a diagram showing the second modification of the detection step of the moving distance of FIG. 2, illustrating a case that only the pointed area is subjected to prescan.

When deterioration of the sample A can be neglected, a typical two-dimensional image in the XZ or YZ direction only in the pointed area may be acquired by prescan and subjected to correlated calculation as shown in FIG. 6. Thus, movement of the pointed area can be more accurately detected.

Figure 7:
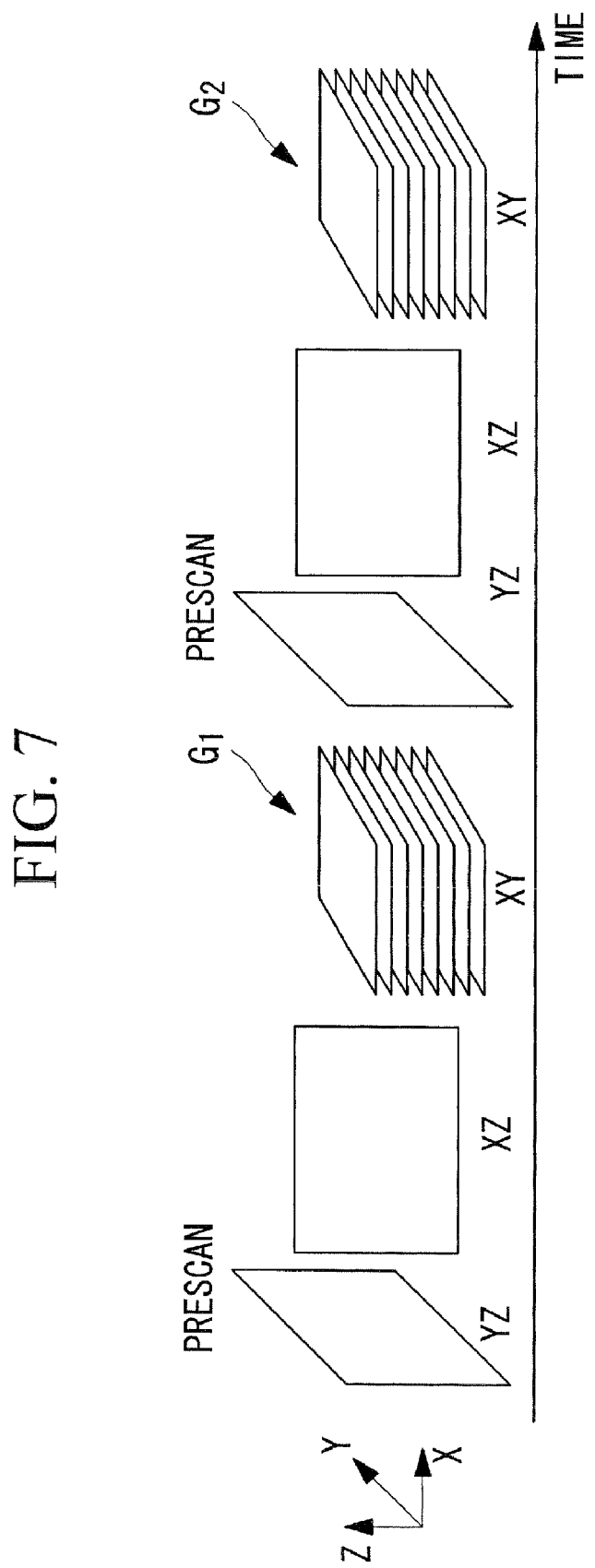
FIG. 7 shows a diagram showing a third modification of the detection step of the moving distance of FIG. 2, illustrating a case that prescan is performed over a wider area than a scan area during acquiring image information.

As shown in FIG. 7, typical two-dimensional images in the XZ or YZ direction may be acquired by prescan over an area wider than the scan area of the scanner in the case that the three-dimensional image information G1 and G2 are acquired, and correlated calculation may be performed using the acquired two prescan images. Thus, when motion of the sample A is large, even if the sample A moves beyond an image acquisition area, the sample A is not overlooked and thus a moving distance of the sample can be detected and corrected, consequently probability of failing in image acquisition can be reduced.

When an interval for between acquisition of the three-dimensional image information G1 and acquisition of the three-dimensional image information G2 is long, prescan may be performed several times within the interval so as to perform sequential correction. This leads to an advantage that the sample A can be prevented from inconveniently moving to a region outside the scan area during the long interval.

In the embodiment, two-dimensional images parallel to the light axis are extracted from the acquired three-dimensional image information G1 and G2, and the moving distance is detected using correlated calculation. However, the moving distance may be detected by using another image processing method.

What is claimed is:

1. A scanning microscope comprising:
   a light source that emits illumination light,
   a scanner that scans the illumination light from the light source in a two-dimensional direction crossing to a light axis,
   an objective lens that irradiates the illumination light scanned by the scanner to a sample, and collects return light from the sample,
   a focusing position adjustment section that adjusts a focal position in a light axis direction of the objective lens,
   a light detector that detect the return light collected by the objective lens,
   a storage section that stores intensity of the return light detected by the light detector, and positional information of an irradiating position of the illumination light set by the scanner and the focusing position adjustment section while relating the intensity to the positional information,
   an image processing section that forms a plurality of two-dimensional images parallel to the light axis on the basis of the intensity of the return light and the positional information of the irradiating position stored in the storage section with a time interval, and processes the two-dimensional images so as to detect a moving distance along a light axis direction of a pointed area of the sample, and
   a controller that controls the focusing position adjustment section so as to correct a light condensing position of the illumination light in accordance with the moving distance of the pointed area detected by the image processing section.

2. The scanning microscope according to claim 1, wherein the storage section stores a plurality of sets of three-dimensional image information produced by acquiring a plurality of two-dimensional image information in a light axis direction with a time interval, the plurality of two-dimensional image information being along the direction crossing to the light axis, and being acquired during scanning of the illumination light by the scanner, and
   the image processing section forms a plurality of two-dimensional images parallel to the light axis on the basis of the plurality of sets of three-dimensional image information stored in the storage section.

3. The scanning microscope according to claim 2, wherein at least one of the two-dimensional images parallel to the light axis is acquired before acquiring the three-dimensional image information.

* * * * *